2 Sheets--Sheet 1.

J. S. & T. B. ATTERBURY.
Methods of and Molds for Manufacturing Glassware.
No. 139,993. Patented June 17, 1873.

Witnesses. Inventor.

2 Sheets--Sheet 2.

J. S. & T. B. ATTERBURY.
Methods of and Molds for Manufacturing Glassware.

No. 139,993. Patented June 17, 1873.

Witnesses,
R. J. Campbell,
J. N. Campbell.

Inventors,
James S. Atterbury
Thos. B. Atterbury
by
Mason Fenwick Lawrence

UNITED STATES PATENT OFFICE.

JAMES S. ATTERBURY AND THOMAS B. ATTERBURY, OF PITTSBURG, PA.

IMPROVEMENT IN METHODS AND MOLDS FOR MANUFACTURING GLASS-WARE.

Specification forming part of Letters Patent No. 139,993, dated June 17, 1873; application filed March 17, 1873.

*To all whom it may concern:*

Be it known that we, JAMES S. ATTERBURY and THOMAS B. ATTERBURY, of Pittsburg, in the county of Allegheny and State of Pennsylvania, have invented an Improvement in the Manufacture of Glass-Ware; and we do hereby declare that the following is a full, clear, and exact description thereof, reference being had to the accompanying drawings making part of this specification, in which—

Figure 1:
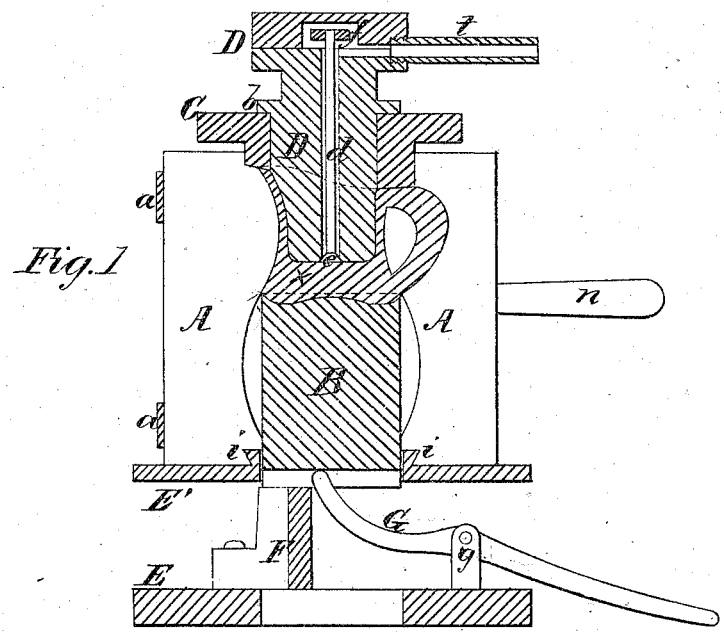
Figure 2:
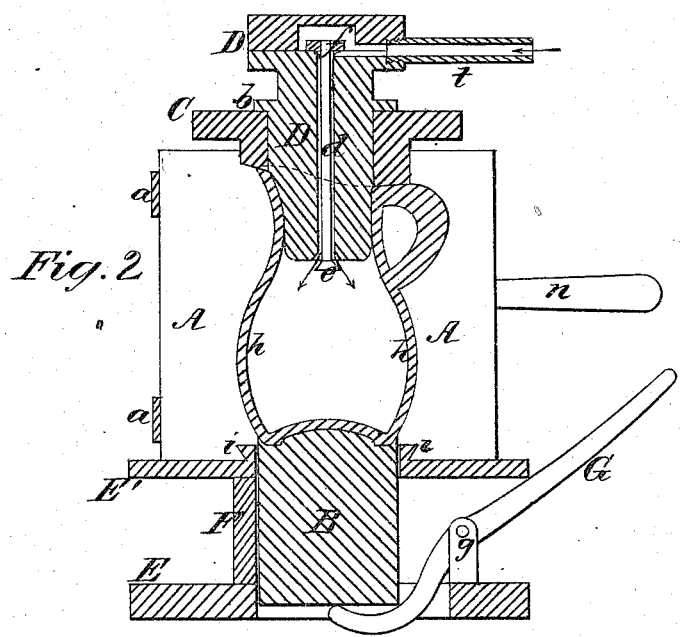
Figure 3:
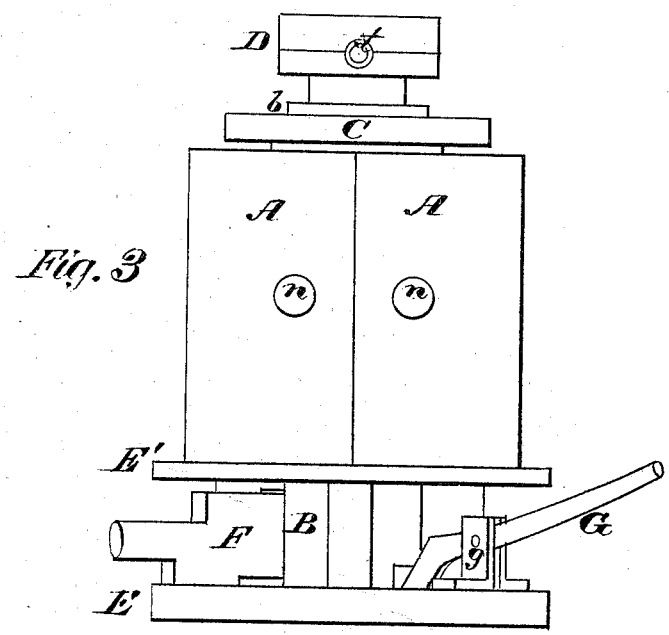
Figure 4:
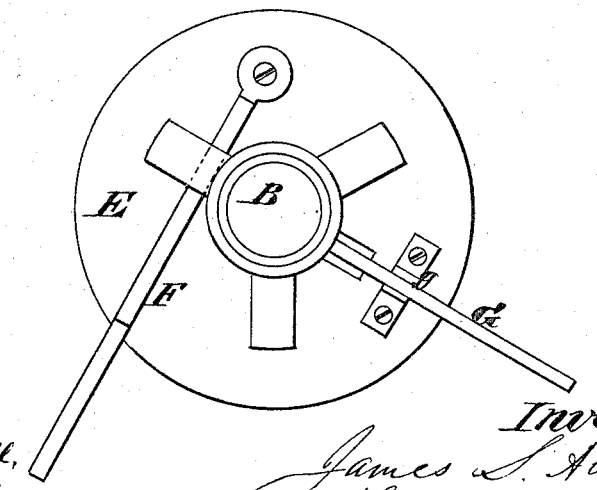

Figure 1, Plate 1, is a vertical sectional view of one form of mold in which to produce our improved ware, showing an article partly formed. Fig. 2, Plate 1, is a similar view of the same parts, showing an article completely formed. Fig. 3, Plate 2, is a front external view of the mold. Fig. 4, Plate 2, is a top view of the movable base and levers for working it.

Similar letters of reference indicate corresponding parts in the several figures.

The object of this invention is to produce out of glass, by processes of casting or pressing and blowing combined, such articles as pitchers, bottles, and other vessels which present contracted necks and bulging bodies, and which it has only been considered practicable heretofore to produce by the process of blowing alone.

The following description of our invention will enable others skilled in the art to understand it.

In the accompanying drawings, I have represented a mold which is intended for the production of glass pitchers; but it will be obvious from what follows that other articles of glass-ware having bulging bodies can be produced by simply adapting the shape of the mold to the shape of the article required.

The mold which I have represented in the accompanying drawings is for the production of glass pitchers, and consists essentially of a body, A, a vertically-movable base, B, a cap, C, and a plunger, D. The body A consists of two vertically-divided halves, which are connected together by hinges *a a*, and provided with handles *n n*. This body A is supported upon a horizontal table, E′, to which it is connected, when shut, by a groove and dovetail-tenon *i*, as shown in the Figs. 1 and 2. Through the center of the table E′ passes the movable base B, the upper end of which gives the final shape to the article during the blowing operation. This base piece is moved up and down by means of a lever, G, which is pivoted to standards *g*, rising from the base E of the mold, and when the base B is raised, as shown in Fig. 1, it is held up by means of a horizontally-movable support, F. The cap C is a movable ring which fits into the upper end of the mold A, and by the curvature of its lower edge leaves the upward edge of the cast portion of the article finished. The plunger D receives vertical movement, and is properly guided during such movement, by any suitable means. The external surface of the lower portion of this plunger corresponds in shape to the interior shape of the upwardly-flaring portion of the article, as shown in Figs. 1 and 2, and at *b* a flange is formed on it, which determines the distance it is to be forced into the mold. The plunger has a passage through it which communicates with a tube, *t*, and at the lower end of such passage a valve-seat is formed provided with an upwardly-closing valve *e*, the stem *d* of which has a step-nut, *f*, on its upper end.

The two halves of the body A are closed and locked. The cap C is adjusted into its place, and the base-piece B raised and held up, as shown in Fig. I. The workman now introduces into the mold on top of the base B a sufficient quantity of hot glass to form the article in question, and immediately brings down the plunger D, which presses the glass into every space above the base B, and thus forms the lip, neck and handle of the article complete. As quickly as possible, and while the body of glass lettered *x* is sufficiently hot for blowing, the base B is dropped, as shown in Fig. 2, and air is forced through the plunger D, which causes the body of glass lettered *x* to assume the shape shown in Fig. 2, thus forming the swelled body *h*, and completing the article.

Prior to our present invention we patented and practiced a process, and produced an article, which differs from the one we now claim, as follows: In that process we first pressed a cup or bowl shaped base. We next brought into use a top mold and blew the body and top of the article out of another piece of glass (a lamp) on the inside of this cup, thus making the glass of double thickness in the cup. In our new process we only use one piece of glass, one glass wall in the article, and we blow the same glass that we press, thus making glassware consisting of blown and pressed glass, either the blown or pressed part being a continuation simply of the other. We put the hot glass in the mold and press, say the mouth, neck and handle of a molasses-pitcher, and by simply lowering the bottom plate we can and do blow the balance of the pitcher. We press the pressed part of the article quite heavy or thick in the bottom, so as to have plenty of glass to expand with the pressure of the air to make the balance of the article. We believe this to be an entirely new process of working glass, and also a new manufacture of glassware.

Having described our invention, what we claim as new, and desire to secure by Letters Patent, is—

1. The process of pressing and blowing glass-ware in the same mold, and thereby making a pressed and blown article of glassware from the same piece of glass, substantially as herein described.

2. The plunger D, provided with an air-passage and a valve, e, substantially as and for the purpose described.

3. The movable base B, and air-injecting plunger D, combined with a glass-mold, substantially as and for the purpose described.

4. The new manufacture of glass-ware, consisting of blown and pressed glass, either the blown or pressed parts being a continuation simply of the other, substantially as described.

JAMES S. ATTERBURY.
THOS. B. ATTERBURY.

Witnesses:
D. WENKE,
E. G. KOSHAU.